US008542379B2

(12) United States Patent

Yun

(10) Patent No.: US 8,542,379 B2

(45) Date of Patent: Sep. 24, 2013

(54) PRINTING COST CHARGING METHOD

(75) Inventor: Tae-jung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1429 days.

(21) Appl. No.: 11/125,345

(22) Filed: May 10, 2005

(65) Prior Publication Data

US 2005/0270564 A1 Dec. 8, 2005

(30) Foreign Application Priority Data

May 22, 2004 (KR) ........................ 10-2004-0036629

(51) Int. Cl.
*G06F 15/00* (2006.01)

(52) U.S. Cl.
USPC .......... 358/1.15; 358/1.9; 358/1.13; 709/227; 726/3; 710/72; 399/79

(58) Field of Classification Search
USPC ............ 358/1.15, 1.9, 1.13; 709/227; 726/3; 710/72; 399/79
See application file for complete search history.

(56) References Cited

U.S. PATENT DOCUMENTS

| | | | | |
|---|---|---|---|---|
| 6,701,845 | B2 * | 3/2004 | Ohmura | 101/484 |
| 6,801,731 | B2 * | 10/2004 | Parker | 399/79 |
| 6,922,725 | B2 * | 7/2005 | Lamming et al. | 709/227 |
| 6,952,726 | B1 * | 10/2005 | White et al. | 709/224 |
| 6,973,514 | B2 * | 12/2005 | Yamaguchi | 710/72 |
| 7,072,059 | B2 * | 7/2006 | Van Der Linden et al. | 358/1.15 |
| 7,170,618 | B2 * | 1/2007 | Fujitani et al. | 358/1.15 |
| 2001/0037264 | A1 * | 11/2001 | Husemann et al. | 705/26 |
| 2002/0024686 | A1 * | 2/2002 | Uchiyama et al. | 358/407 |
| 2002/0057449 | A1 * | 5/2002 | Chapman et al. | 358/1.15 |
| 2003/0151631 | A9 * | 8/2003 | Miyata et al. | 345/838 |
| 2003/0151768 | A1 * | 8/2003 | Iida | 358/1.15 |
| 2004/0059671 | A1 * | 3/2004 | Nozaki et al. | 705/39 |
| 2004/0130744 | A1 * | 7/2004 | Wu et al. | 358/1.15 |
| 2005/0105496 | A1 * | 5/2005 | Ambrosino | 370/338 |
| 2006/0105742 | A1 * | 5/2006 | Kim et al. | 455/411 |
| 2008/0295159 | A1 * | 11/2008 | Sentinelli | 726/6 |

FOREIGN PATENT DOCUMENTS

| | | |
|---|---|---|
| JP | 2002-149378 | 5/2002 |
| JP | 2002-287938 | 10/2002 |
| JP | 2003-050676 | 2/2003 |
| KR | 2002-0022035 | 3/2002 |

* cited by examiner

*Primary Examiner* — David K Moore
*Assistant Examiner* — Mark Milia
(74) *Attorney, Agent, or Firm* — Roylance, Abrams, Berdo & Goodman, LLP

(57) ABSTRACT

A printing cost charging method of a printing system wherein the printing system includes a mobile terminal, an image forming apparatus capable of communicating data with the mobile terminal, and a server capable of communicating data with the mobile terminal via a wireless communication network. The printing cost charging method comprises the steps of transmitting printing data from the mobile terminal to the image forming apparatus, transmitting printing information relating to the printing data from the image forming apparatus to the mobile terminal, transmitting the printing information from the mobile terminal to the server, and controlling the server to charge a printing cost to the mobile terminal based on the printing information. Costly equipment and potential errors are reduced as the server of the printing system which charges the printing cost interfaces with the mobile terminal without the Internet.

14 Claims, 6 Drawing Sheets

PRINTING COST CHARGING METHOD

CROSS-REFERENCE TO RELATED APPLICATIONS

This application claims the benefit under 35 U.S.C. §119 (a) of Korean Patent Application No. 10-2004-0036629 filed in the Korean Intellectual Property Office on May 22, 2004, the entire disclosure of which is hereby incorporated by reference.

BACKGROUND OF THE INVENTION

1. Field of the Invention

The present invention relates generally to a printing system and method for charging a printing cost. More specifically, the present invention relates to a printing system and method capable of transmitting printing data or charging a printing cost by means of a communication function of a mobile terminal without having to connect an image forming apparatus to a charging server via a network.

2. Description of the Related Art

Currently, mobile terminals are prevalently utilized worldwide. These mobile terminals are taking the place of conventional fee payment means, and are coming into use as financial payment means and identification means for indicating personal information. The Internet also comes into a wide use with the prevalence of these mobile terminals, and diverse services, for example, an electronic settlement, are further provided in association with the mobile terminals and the Internet. Typically, service providers build a server connected to the Internet, process services requested via the mobile terminals or the Internet, and charge service fees through the mobile terminals.

FIG. 1 is a conceptual diagram of a conventional printing system capable of charging a printing cost.

Referring to FIG. 1, the printing system includes at least one printer 11*a*~11*n* connected to the Internet 12, a mobile terminal 16 capable of connecting to the printers 11*a*~11*n* in a wired manner, a communication network provider 15 for providing a wireless network to the mobile terminal 16, an ASP (application service provider) server 13 connected with the Internet 12, and an authentication DB (database) 14 for providing authentication information to the ASP server 13. The ASP server 13 receives printing information from the printers 11*a*~11*n* and charges a fee to the communication network provider 15.

In a charging method of the above conventional printing system, a user connects the mobile terminal 16 to one of the printers 11*a*~11*n* through a USB (universal serial bus) cable, and transmits printing data in the mobile terminal 16 to a destination, for example, the printer 11*a*. Upon the termination of the printing job, the printer 11*a* transmits printing information relating to the number of printed sheets to the ASP server 13. The ASP server 13 includes a charging processor 13*a* and a data processor 13*b*. The charging processor 13*a* accesses an authentication DB operated by a governmental organization or the communication network provider 15, and obtains and confirms the personal information of the user of the mobile terminal 16. The data processor 13*b* generates printing data relating to the printing job requested by the user of the mobile terminal 16 being authenticated. The ASP server 13 notifies the communication network provider 15 of the cost to be charged to the user according to the printing information received from the printer 11*a*, and thus the cost for using the printing system is charged on the user.

The conventional printing system has disadvantages in that a high-priced network interface card is necessary for the Internet connection of each of the printers 11*a*~11*n*, and a program is required for calculating the fee based on the printing information. Furthermore, the respective printers 11*a*~11*n* have to be installed at locations accessible to the Internet 12.

Accordingly, a need exists for a printing system and method for charging printing costs that does not require high-priced network equipment, such that the unit cost of the apparatus can be lowered.

SUMMARY OF THE INVENTION

The present invention has been developed in order to solve the problems discussed above and others associated with the conventional arrangement. An aspect of the present invention is to provide a printing system and a charging method of the printing system that can be implemented without using Internet connections and an expensive network interface card.

To achieve the above and other aspects of the present invention, a printing cost charging method is provided for a printing system which has an image forming apparatus capable of communicating data with a mobile terminal, and a server capable of communicating data with the mobile terminal via a wireless communication network. The printing cost charging method comprises the steps of transmitting printing data from the mobile terminal to the image forming apparatus, transmitting printing information relating to the printing data from the image forming apparatus to the mobile terminal, transmitting the printing information from the mobile terminal to the server, and controlling the server to charge a printing cost to the mobile terminal based on the printing information.

The step of transmitting the printing information comprises the sub-step of authenticating the mobile terminal by the server.

The step of authenticating by the server comprises the sub-steps of transmitting a phone number of the mobile terminal to the server via the wireless communication network, and controlling the server to provide confirmation of user information relating to the phone number to a provider that provides the wireless communication network to the mobile terminal.

The mobile terminal and the image forming apparatus communicate data using one of a wired interface and a wireless interface.

Consistent with the above aspects of the embodiments of the present invention, there is further provided a printing cost charging method of a printing system which has a mobile terminal, an image forming apparatus capable of communicating data with the mobile terminal, and a server capable of communicating data with the mobile terminal via a wireless communication network. The printing cost charging method comprises the steps of authenticating the mobile terminal by the server, requesting printing data from the authenticated mobile terminal to the server, charging a fee for the requested printing data by the server and transmitting the printing data to the mobile terminal, and transmitting the printing data from the mobile terminal to the image forming apparatus for printing.

The step of authenticating by the server comprises the sub-steps of transmitting a phone number of the mobile terminal to the server via the wireless communication network, and the server then confirming user information relating to the phone number and providing confirmation to a provider that provides the wireless communication network to the mobile terminal.

The step of authenticating by the server further comprises the sub-steps of connecting the mobile terminal to the server and acquiring a password with respect to an image forming apparatus adjacent to the mobile terminal through the server.

The mobile terminal and the image forming apparatus communicate data using one of a wired interface and a wireless interface.

The server connects to a server of a network provider having the user information of the mobile terminal via a network.

The step of transmitting the printing data to the mobile terminal comprises the sub-steps of the server receiving information relating to the requested printing data from the mobile terminal, the server acquiring the requested information from the server of the network provider, and the server converting the information acquired from the network provider to printing data and transmitting the printing data to the mobile terminal.

Consistent with the above aspects of the embodiments of the present invention, a printing system is further provided having a printing cost charging function that comprises an image forming apparatus operable to communicate data with a mobile terminal by either wire or wireless means, generate printing information relating to a file transmitted from the mobile terminal, and transmit the generated printing information to the mobile terminal. The apparatus further comprises a server operable to charge a cost to the mobile terminal based on the printing information transmitted from the image forming apparatus and information relating to the portable terminal.

The printing information relates to at least one of a number of printed sheets, a paper size, ink and toner consumed by the image forming apparatus, and a printing rate with respect to printing data transmitted from the mobile terminal to the image forming apparatus.

The server further connects to a server of a network provider having user information of the mobile terminal via a network.

BRIEF DESCRIPTION OF THE DRAWING FIGURES

These and other aspects and advantages of the present invention will become apparent and more readily appreciated from the following description of exemplary embodiments, taken in conjunction with the accompanying drawing figures of which:

Throughout the drawings, like reference numerals will be understood to refer to like parts, components and structures.

DETAILED DESCRIPTION OF EXEMPLARY EMBODIMENTS

Figure 1:
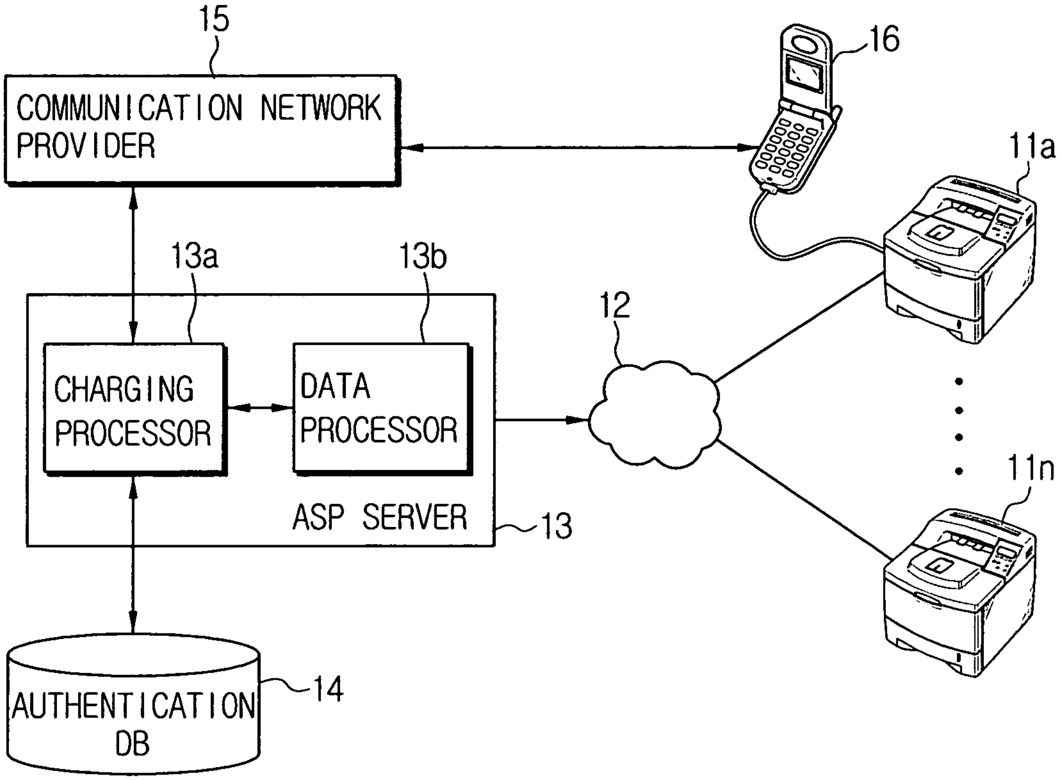
FIG. 1 (PRIOR ART)
FIG. 1 is a conceptual diagram of a printing system having a conventional charging method.

Reference will now be made in detail to embodiments of the present invention, examples of which are illustrated in the accompanying drawings, wherein like reference numerals refer to like elements throughout. Exemplary embodiments are described below in order to explain the present invention by referring to the drawings.

Figure 2:
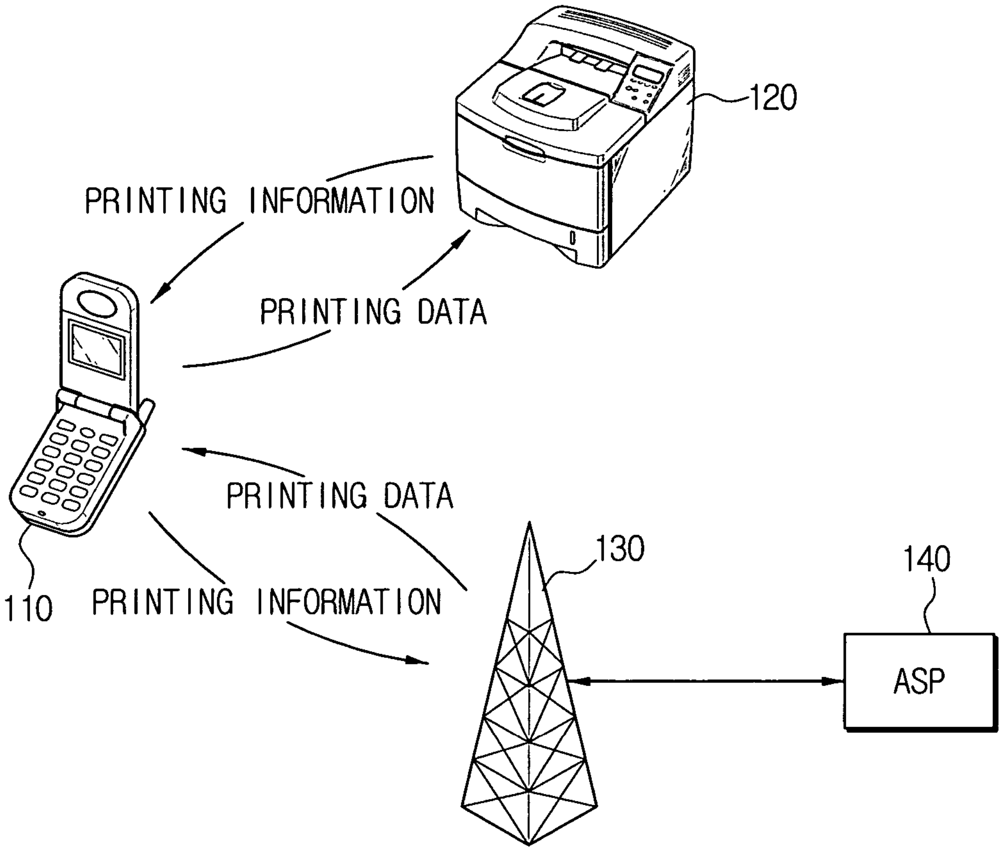
FIG. 2 is a conceptual diagram of a printing system according to an embodiment of the present invention.

FIG. 2 illustrates a printing system according to an embodiment of the present invention.

In FIG. 2, the printing system includes a mobile terminal 110, a printer 120, a wireless communication network 130, and an ASP (application service provider) server 140.

The mobile terminal 110 is able to communicate data by wired and wireless technologies, and can further store and transmit files. The mobile terminal 110 is connected with the printer 120 by use of a communication protocol such as USB, IrDA, and Bluetooth. The printer 120 is provided with an interface corresponding to the communication protocol such as USB, IrDA and Bluetooth, for engaging in data communication with the mobile terminal 110. The printer 120 prepares to print the printing data transmitted from the mobile terminal 110 upon connection with the mobile terminal 110. Upon receiving the printing data from the mobile terminal 110, the printer 120 calculates the amount of printout from the received printing data, and transmits to the mobile terminal 110 printing information relating to the calculated number of printed sheets, paper and ink or toner consumption used for the printing job. The mobile terminal 110 forwards the printing information received from the printer 120 to the wireless communication network 130. The wireless communication network 130 sends the received printing information to the ASP server 140.

According to an embodiment of the present invention, the printer 120 neither calculates nor charges a cost for the printing of the data received from the mobile terminal 110. In addition, the printer 120 does not connect to a network or the Internet. In transmitting the printing information via the wireless communication network 130, the mobile terminal 110 informs the wireless communication network 130 of its phone number. The wireless communication network 130 provides the phone number and personal information according to the phone number to the ASP server 140. The ASP server 140 charges the printing fee based on the phone number of the mobile terminal 110 and the personal information of the user of the mobile terminal 110. Accordingly, the printing system does not require the printer 120 and the ASP server 140 to connect to each other via the Internet or a network. The ASP server 140 receives the printing information and the information on the mobile terminal 110 from the mobile terminal 110, and then charges the fee on a provider of the wireless communication network 130 based on the received information.

If the mobile terminal 110 has not stored the printing data to be printed by the user of the mobile terminal 110, it is necessary that the mobile terminal 110 communicates a request for the printing data to the ASP server 140, receives the requested printing data from the ASP server 140, and provides the data to the printer 120. In this situation, the mobile terminal 110 first connects to the ASP server 140 via the wireless communication network. After connecting to the ASP server 140, the mobile terminal 110 can log in to the ASP server 140 if the mobile terminal is registered in the ASP server 140. Otherwise, the user of the mobile terminal 110 enters his/her personal information in a form provided by the ASP server 140 or connects to the ASP server 140 without logging in if certain information is agreed to be shared between the provider of the wireless communication network 130 and a provider of the ASP server 140. After the mobile terminal 110 is connected to the ASP server 140, the user of the mobile terminal 110 communicates a request for a desired printout to the ASP server 140. For example, if the user wants to obtain a certificated copy of his/her resident registration, the ASP server 140 requests access to a server (not shown) operated by a related government agency. When the access is approved, the ASP server 140 receives a file containing the certified copy of the resident registration from the server (not shown) and converts the file into printing data. The converted printing data is sent to the mobile terminal 110 and then to the printer 120 to be printed.

Figure 3:
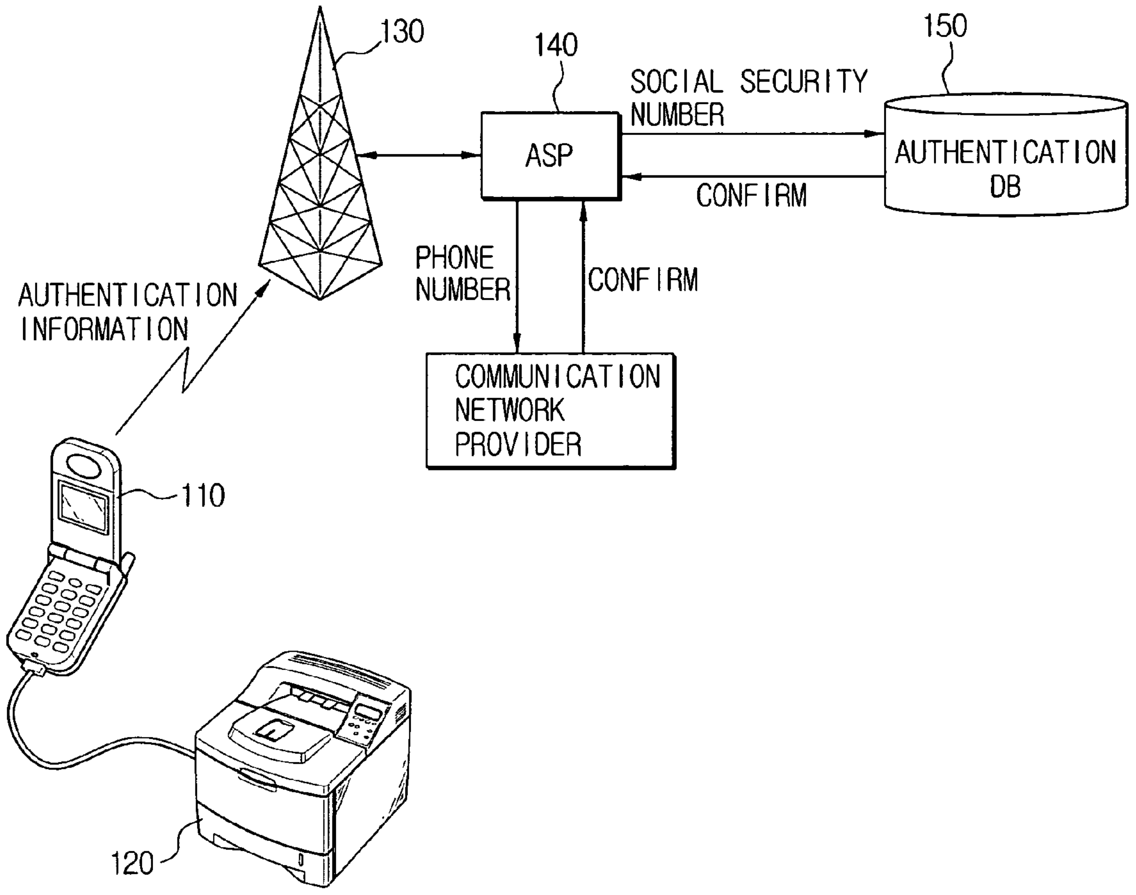
FIG. 3 is a conceptual diagram illustrating a mobile terminal that is authenticated by a server in the printing system according to an embodiment of the present invention.

FIG. 3 illustrates an example of the mobile terminal 110 authentication from the ASP server 140 in the printing system according to an embodiment of the present invention.

In FIG. 3, the mobile terminal 110 that is connected with the printer 120 through a certain interface (for example, USB), accesses the ASP server 140 via the wireless communication network 130. The ASP server 140 may or may not provide information to the provider of the wireless communication network 130 by mutual agreement. If the ASP server 140 has agreed with the wireless communication provider to provide information, the mobile terminal 110 can connect to the Internet via the wireless communication network 130 without having to log in. If there is no agreement between the provider of the wireless communication network 130 and the ASP server 140, the mobile terminal 110 has to connect to the ASP server 140 through a log-in or by providing personal information such as a phone number and a social security number. The ASP server 140, upon receiving the personal information from the mobile terminal 110, provides the received personal information to the communication network provider and inquires about the reliability of the information. When the communication network provider authenticates the information, the ASP server 140 transmits the printing data to the wireless communication network 130 via the Internet, and the wireless communication network 130 transmits the received printing information to the mobile terminal 110. In an exemplary embodiment of the present invention, it is preferable that the ASP server 140 access servers of public institutions or private organizations that issue copies or registers through the Internet so as to provide information relating to various printouts requested by the user of the mobile terminal 110. Such information may be a copy or an abstract of the residence registration, a copy of the register, a tax bill, or a copy relating to movable property and/or real estate.

Figure 4:
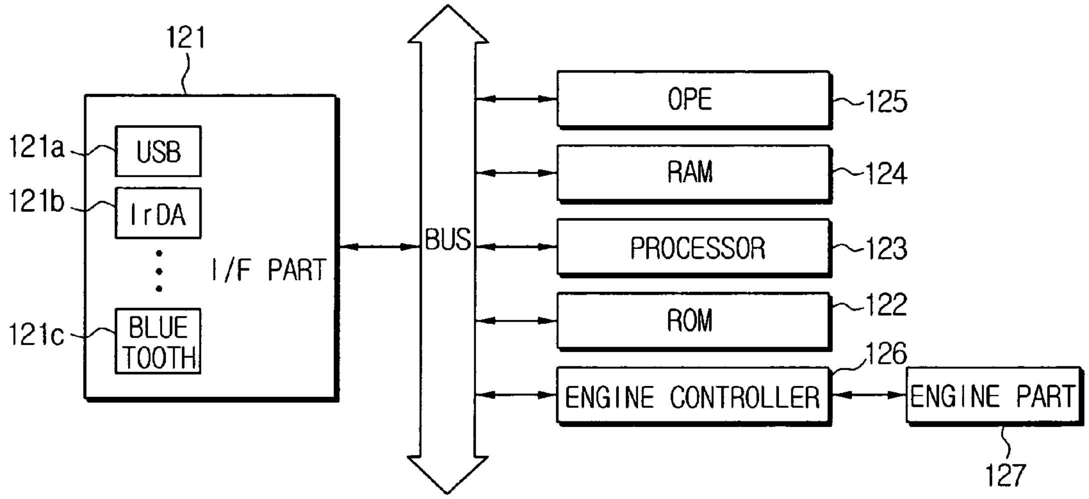
FIG. 4 is block diagram illustrating an example of an image forming apparatus in the printing system according to an embodiment of the present invention.

FIG. 4 illustrates an example of an image forming apparatus employed in the printing system according to an embodiment of the present invention.

In FIG. 4, the exemplary image forming apparatus is an electrophotographic printer and includes an interface part 121 for interfacing with the mobile terminal 110, a ROM (read only memory) 122, a processor 123, a RAM (random access memory) 124, an operation panel (OPE) 125, an engine controller 126, and an engine part 127.

The interface part 121 is responsible for the data communication between the printer 120 and the mobile terminal 110. Typically, the mobile terminal 110 such as a PDA (personal digital assistant) and a notebook, adopts a communication protocol compliant with Bluetooth or IrDA (Infrared Data Association) for the data communication over a short range. Other mobile terminals exist which are further capable of utilizing USB (universal serial bus) for bulky data transmission and reception. Most of the mobile terminals currently available allow communication according to at least one of Bluetooth, IrDA and USB communication protocols. Accordingly, the interface part 121 supports communication protocols prevalently used for data communication with such mobile terminals. However, the interface part 121 is also designed to comply with new communication methods applied to the mobile terminals, as well as the above-described communication protocols. In the event that the image forming apparatus is installed in a region of a local network, the interface part 121 can be further equipped with a network interface card and a RJ-45 jack for providing a connection to the local network.

The operation panel 125 displays the state of the printer 120 when the user performs the printing setup for the image forming apparatus or when the user desires to know information on the state of the image forming apparatus. The operation panel 125 is provided with a display device such as an LCD (liquid crystal display) so that the user can select a desired printing option through the display device. For example, the operation panel 125 of the image forming apparatus may display a menu for the user to set up printing resolution, printing density, scale and paper supply, and which allows the user to select an intended printing option for his/her printout.

The ROM 122 stores a control program to control the image forming apparatus, and further stores setup values of the printing option set by the user through the operation panel 125. For example, the ROM 122 can store setup values of the resolution, the printing density, and the scale set by user with respect to the image forming apparatus.

The processor 123 controls the overall operations of the image forming apparatus and converts the printing data received from the interface part 121, into bitmap data. The processor 123 renders and transmits the printing data to be printed to the engine controller 126 based on the resolution information and the scale information stored in the ROM 122. The engine controller 126 further controls the driving of devices such as a motor or an actuator in the engine part 127 based on the data rendered by the processor 123, and outputs an intended printout of the user.

Figure 5:
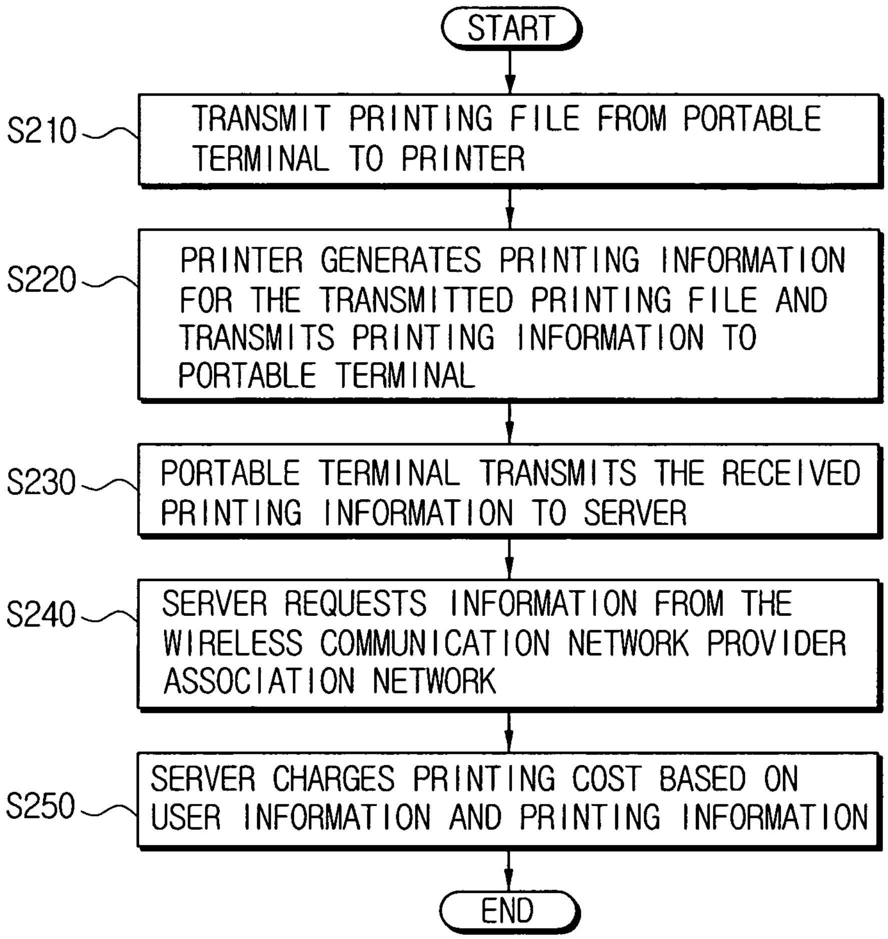
FIG. 5 is a flowchart of a printing cost charging method of a printing system according to an embodiment of the present invention.

FIG. 5 is a flowchart of a printing cost charging method of a printing system according to an embodiment of the present invention.

FIG. 5 illustrates an example implementation wherein the ASP server 140 charges the printing cost through the wireless communication network 130 connected with the mobile terminal 110, and wherein the mobile terminal 110 is not authenticated via the authentication procedure of the ASP server 140.

In the method of FIG. 5, the mobile terminal 110 first connects to the printer 120 via a wire or wireless communication protocol, and transmits a file to be printed to the printer 120 at step (S210). The mobile terminal 110 may connect to the printer 120 in conformity with a wire or wireless protocol such as USB, Bluetooth and IrDA. It is preferable that the mobile terminal 110 further provides functions for storing and transmitting a file, and that the printer 120 has a general-purpose protocol. As a typical mobile phone is able to store and transmit a file, and also utilize at least one of a communication protocol such as USB, Bluetooth and IrDA, it may be used as the mobile terminal 110 in this example. The mobile terminal 110 connects to the printer 120 by means of its communication protocol.

The printer 110 receives the printing file from the mobile terminal 110 and prints the printing file. At the same time, the printer 120 generates printing information relating to the number of sheets of the printout, amount of ink or toner being consumed, and printing rate according to errors occurring during the printing job, in the form of a file and transmits the generated printing information to the mobile terminal 110 at step (S220). The printing rate can be utilized as information to prevent charging for abnormally printed papers caused due to errors in the printout. The mobile terminal 110 transmits the printing information received from the printer 120 to the ASP server 140 via the wireless communication network 130 at step (S230).

The wireless communication network 130 forwards the information relating to the mobile terminal 110, that is, the phone number of the mobile terminal 110 and the printing information received through the mobile terminal 110, to the ASP server 140. The ASP server 140 then requests user information about the phone number of the mobile terminal 110 by connecting to the provider of the wireless communication network 130 or by connecting to a database or a server (not shown) storing user information of the wireless communication network 130, so as to charge the cost of the printing information received via the wireless communication network 130 at step (S240). The ASP server 140 estimates the printing cost based on the user information acquired from the provider of the wireless communication network 130, database or the server of the wireless communication network 130, and notifies the provider of the wireless communication network 130 of the printing cost at step (S250).

If an agency owning the ASP server 140 is a party to a contract or agreement with the provider of the wireless communication network 130, for example, if the agency of the ASP server 140 is under contract to exchange information with the provider of the wireless communication network 130, the ASP server 140 can acquire the user information by connecting directly to the database or the server of the wireless communication network 130.

Figure 6:
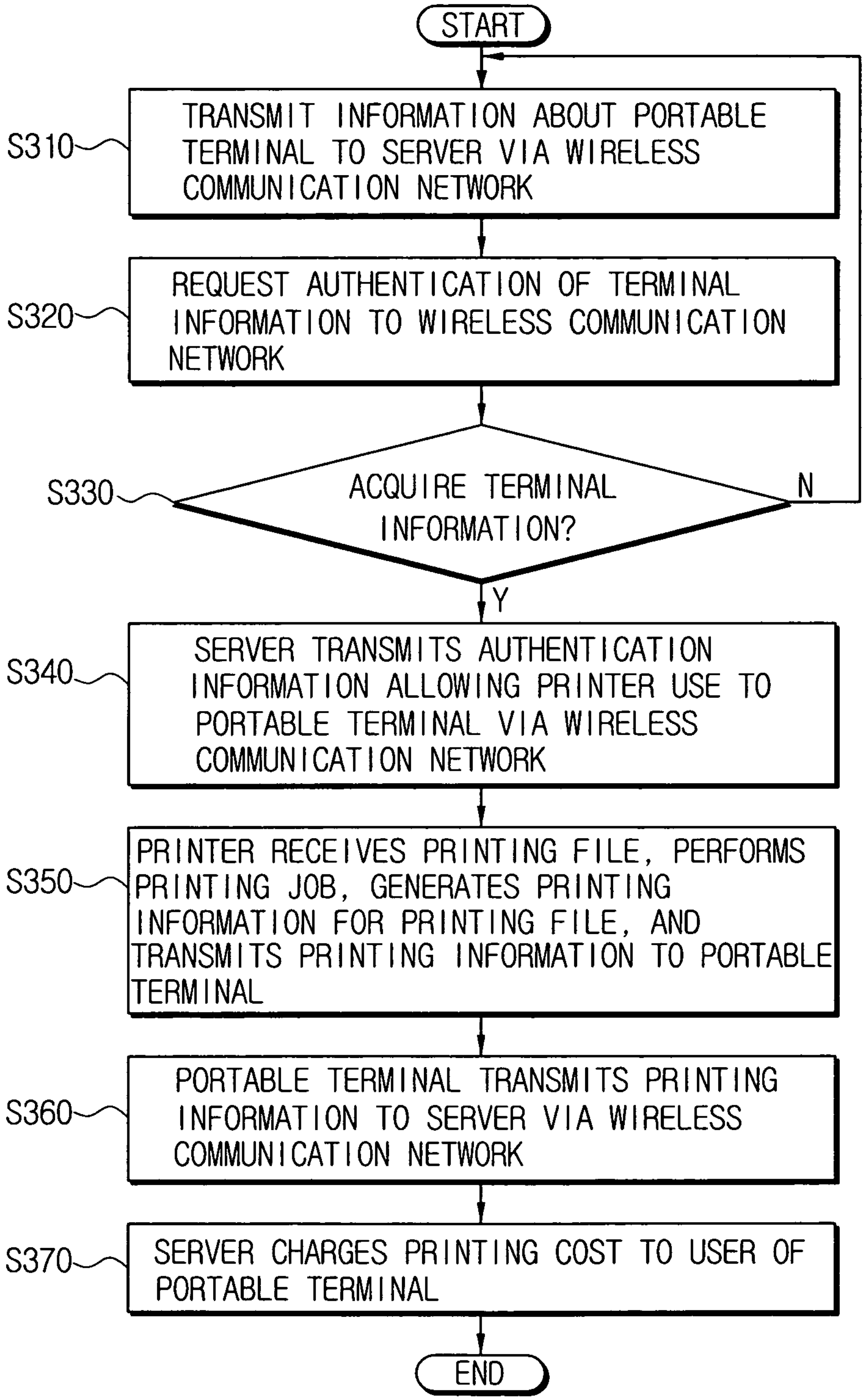
FIG. 6 is a flowchart of a printing cost charging method of a printing system according to another embodiment of the present invention.

FIG. 6 is a flowchart of a printing cost charging method of a printing system according to another embodiment of the present invention.

FIG. 6 illustrates an example implementation wherein the mobile terminal 110 is directly authenticated by the ASP server 140, and the ASP server 140 charges the printing cost via the wireless communication network 130 connected with the mobile terminal 110.

In the method of FIG. 6, the user first connects the mobile terminal 110 to the printer 120 via a wire or wireless communication protocol, and accesses the ASP server 140 via the wireless communication network 130 at step (S310). For example, the mobile terminal 110 can access a web page provided by the ASP server 140. Also at step (S310), the mobile terminal 110 can transmit information about the terminal to the ASP server 140 via the wireless communication network.

The mobile terminal 110 then requests to use the intended printer 120 at step (S320). While requesting the use of the printer 120, the user of the mobile terminal 110 provides a phone number and personal information to the ASP server 140, and the server 140 requests authentication of the terminal information at step (S320). The ASP server 140 acquires the information relating to the mobile terminal 110 and the user of the mobile terminal 110, and authentication of the terminal information at step (S330). After acquiring the authenticated user information and the information on the mobile terminal 110, the ASP server 140 transmits authentication information for the printer 120 to be used by the user, such as a password for operating the printer 120, to the mobile terminal 110 at step (S340). If the authentication information is input by the user and is correct, the printer 120 receives and prints the printing file from the mobile terminal 110 at step (S350).

The printer 120 also generates printing information relating to the printout, that is, printing information relating to the number of sheets of the printout, the amount of ink or toner being consumed, and the printing rate according to printing errors occurring during the printing job in the form of a file, and transmits the generated file to the mobile terminal 110 at step (S350). The printing rate can be utilized to prevent charging for abnormally printed papers caused due to errors in the printout. The mobile terminal 110 forwards the printing information from the printer 120 to the ASP server 140 via the wireless communication network 130 at step (S360). The ASP server 140 estimates the printing cost based on the printing information received from the mobile terminal 110 and the user information (or the mobile terminal information) previously acquired from the mobile terminal 110, and notifies the provider of the wireless communication network 130 of the printing cost at step (S370).

The server of the printing system which charges the printing cost through the image forming apparatus according to embodiments of the present invention described above, interfaces with the mobile terminal without the Internet, and further authenticates the mobile terminal and receives the printing data. As the image forming apparatus does not require high-priced network equipment, the unit cost of the image forming apparatus can be lowered. Also, since the printing data is not delivered to the image forming apparatus via the Internet, there is no influence from Internet connection failures. Furthermore, it is possible to minimize the resources required for the server since the mobile terminal and the wireless network provider are responsible for the transmission of the printing data and the authentication of the mobile terminal.

While the invention has been shown and described with reference to certain exemplary embodiments thereof, it will be understood by those skilled in the art that various changes in form and detail may be made therein without departing from the spirit and scope of the invention as defined by the appended claims.

What is claimed is:

1. A printing cost charging method for a printing system which has an image forming apparatus capable of communicating data with a mobile terminal, and a mobile terminal server capable of communicating data with the mobile terminal via a wireless communication network, the printing cost charging method comprising the steps of:

transmitting printing data from the mobile terminal to the image forming apparatus;

after the transmission of the printing data to the image forming apparatus, printing the printing data at the image forming apparatus;

after the printing of the printing data at the image forming apparatus, generating printing information relating to a performed printing job according to the printing data at the image forming apparatus;

after the generation of the printing information at the image forming apparatus, transmitting the printing information from the image forming apparatus to the mobile terminal;

after the transmission of the printing information to the mobile terminal, transmitting the printing information and phone number information together from the mobile terminal to the mobile terminal server and calculating at the mobile terminal server of the mobile terminal a printing cost using the printing information received from the mobile terminal; and after the calculation of the printing cost at the mobile terminal server, charging the printing cost by the mobile terminal server based on the printing information, to an operator of the mobile terminal based on the phone number information, received together from the mobile terminal at the mobile terminal server.

2. The printing cost charging method according to claim 1, wherein the step of transmitting the printing information from the mobile terminal to the mobile terminal server comprises the sub-step of authenticating the mobile terminal by the mobile terminal server.

3. The printing cost charging method according to claim 2, wherein the step of authenticating the mobile terminal by the mobile terminal server comprises the sub-steps of:

transmitting a phone number of the mobile terminal to the mobile terminal server via the wireless communication network; and controlling the mobile terminal server to communicate a request to confirm user information relating to the phone number to a provider that provides the wireless communication network to the mobile terminal.

4. The printing cost charging method according to claim 1, wherein the mobile terminal and the image forming apparatus communicate data using one of a wired interface and a wireless interface.

5. A printing cost charging method for a printing system which has a mobile terminal, an image forming apparatus capable of communicating data with the mobile terminal, and a mobile terminal server capable of communicating data with the mobile terminal via a wireless communication network, the printing cost charging method comprising the steps of:

authenticating the mobile terminal by the mobile terminal server;

after the authentication of the mobile terminal, requesting printing data by the authenticated mobile terminal from the mobile terminal server;

after the request by the authenticated mobile terminal, transmitting the printing data to the mobile terminal;

after the transmission of the printing data to the mobile terminal, transmitting the printing data from the mobile terminal to the image forming apparatus;

after the transmission of the printing data to the image forming apparatus, printing the printing data at the image forming apparatus;

after the printing of the printing data at the image forming apparatus, generating printing information relating to a performed printing job according to the printing data at the image forming apparatus;

after the generation of the printing information at the image forming apparatus, transmitting the printing information from the image forming apparatus to the mobile terminal, then transmitting the printing information and phone number information together from the mobile terminal to the mobile terminal server, and then calculating at the mobile terminal server of the mobile terminal a printing fee using the printing information received from the mobile terminal; and after the calculation of the printing fee at the mobile terminal server, charging the printing fee for the requested printing data based on the printing information, to an operator of the mobile terminal based on the phone number information, received together from the mobile terminal at the mobile terminal server.

6. The printing cost charging method according to claim 5, wherein the step of authenticating the mobile terminal by the mobile terminal server comprises the sub-steps of:

transmitting a phone number of the mobile terminal to the mobile terminal server via the wireless communication network; and controlling the mobile terminal server to communicate a request to confirm user information relating to the phone number to a provider that provides the wireless communication network to the mobile terminal.

7. The printing cost charging method according to claim 6, wherein the step of authenticating the mobile terminal by the mobile terminal server further comprises the sub-steps of:

connecting the mobile terminal to the mobile terminal server; and acquiring a password with respect to an image forming apparatus through the mobile terminal server.

8. The printing cost charging method according to claim 5, wherein the mobile terminal and the image forming apparatus communicate data using one of a wired interface and a wireless interface.

9. The printing cost charging method according to claim 5, wherein the mobile terminal server connects to a server of a network provider having the user information of the mobile terminal via a network.

10. The printing cost charging method according to claim 5, wherein the step of transmitting the printing data to the mobile terminal comprises the sub-steps of:

receiving information at the mobile terminal server relating to the requested printing data from the mobile terminal;

acquiring the requested information at the mobile terminal server from a network provider; and converting the information acquired from the network provider to printing data and transmitting the printing data to the mobile terminal.

11. A printing system having a printing cost charging function, comprising:

an image forming apparatus operable to communicate data with a mobile terminal via wire or wireless protocol, receive printing data from the mobile terminal, print the received printing data, generate printing information relating to a performed printing job according to the printing data transmitted from the mobile terminal, and transmit the generated printing information to the mobile terminal; and a mobile terminal server of the mobile terminal operable to calculate at the mobile terminal server of the mobile terminal a printing cost using the printing information and phone number information received together from the mobile terminal, and charge the cost based on the printing information, to an operator of the mobile terminal based on the phone number information, received together from the mobile terminal at the mobile terminal server.

12. The printing system according to claim 11, wherein the image forming apparatus further comprises at least one interface for data communication via USB, Bluetooth, or IrDA protocol.

13. The printing system according to claim 11, wherein the printing information comprises information relating to at least one of a number of printed sheets, a paper size, ink and toner consumed by the image forming apparatus, and a printing rate with respect to printing data transmitted from the mobile terminal to the image forming apparatus.

14. The printing system according to claim 11, wherein the mobile terminal server connects to a server of a network provider having user information of the mobile terminal via a network.

* * * * *